United States Patent [19]

Wolze

[11] Patent Number: 4,859,926
[45] Date of Patent: Aug. 22, 1989

[54] POWER CONTROLLER FOR HEATER LOAD

[75] Inventor: David A. Wolze, San Jose, Calif.

[73] Assignee: Impact Systems, Inc., San Jose, Calif.

[21] Appl. No.: 145,526

[22] Filed: Jan. 19, 1988

[51] Int. Cl.⁴ .............................................. G05F 1/455
[52] U.S. Cl. ....................................... 323/241; 323/322
[58] Field of Search ................ 323/237, 241, 246, 318, 323/319, 320, 322

[56] References Cited

U.S. PATENT DOCUMENTS

| | | | |
|---|---|---|---|
| 4,063,146 | 12/1977 | Oliver | 323/241 |
| 4,117,392 | 9/1978 | Kintigh et al. | 323/241 |
| 4,358,729 | 11/1982 | Hart | 323/322 |
| 4,494,316 | 1/1985 | Stephansen et al. | 219/388 X |
| 4,661,765 | 4/1987 | Bando et al. | 323/322 X |

FOREIGN PATENT DOCUMENTS 2120422 11/1983 United Kingdom ................ 323/241

Primary Examiner—Patrick R. Salce
Assistant Examiner—Kristine Peckman

[57] ABSTRACT

A controller for a load such as the heater elements of an actuator for drying the various zones or slices of a moving sheet of a papermaking machine includes silicon controlled rectifiers for each zone or slice of the moving sheet whose firing angle is controlled by an external power command signal. This power command signal is processed by a digital signal processor which strobes at a high rate the line voltage and load current to provide a closed loop feedback control technique for power being applied to the load and in addition, the processor, at the same time, has an open loop firing angle control routine which has a fast response time to protect against abnormal conditions within one-half cycle of load voltage.

9 Claims, 10 Drawing Sheets

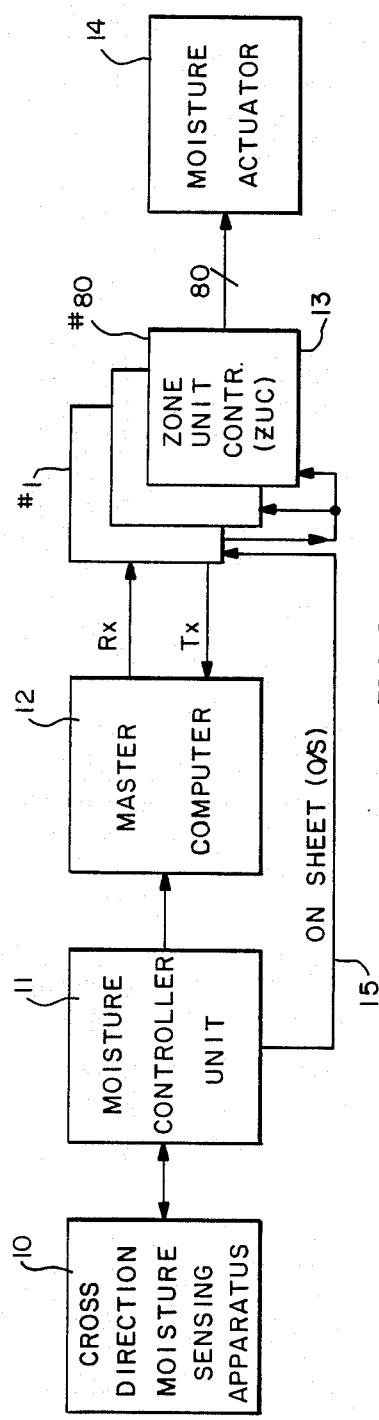
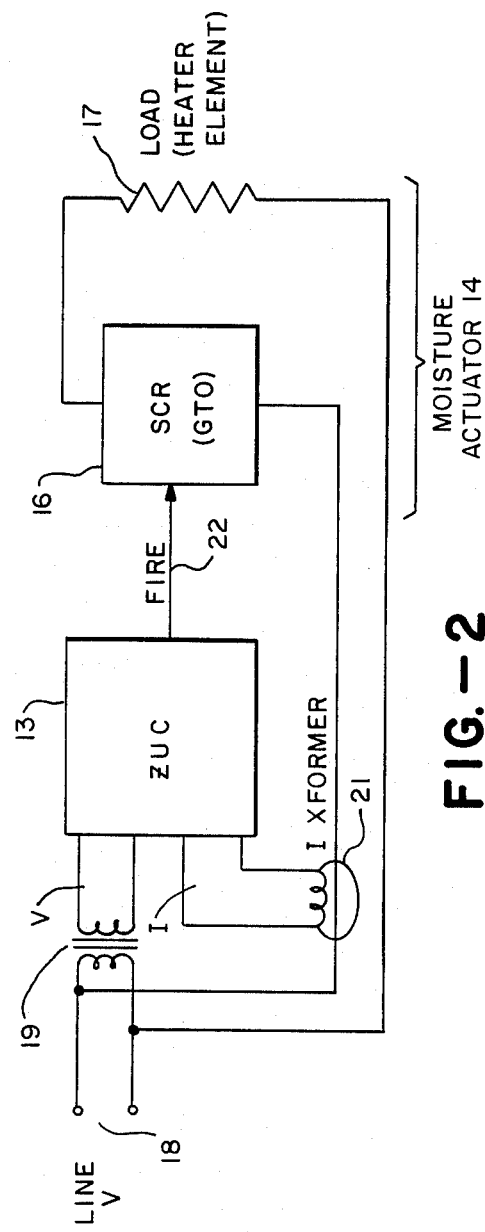
FIG.-1
FIG.-2

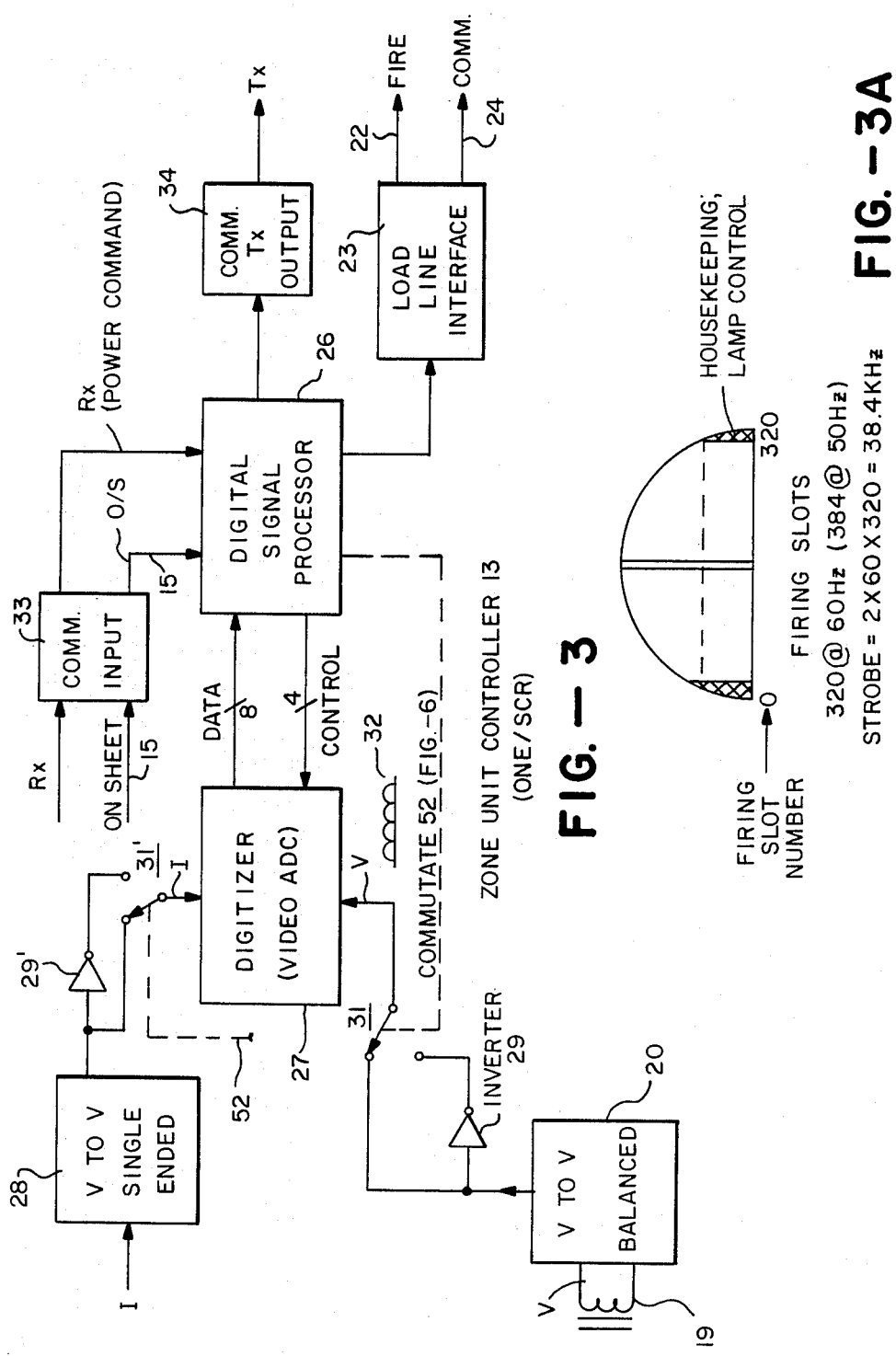

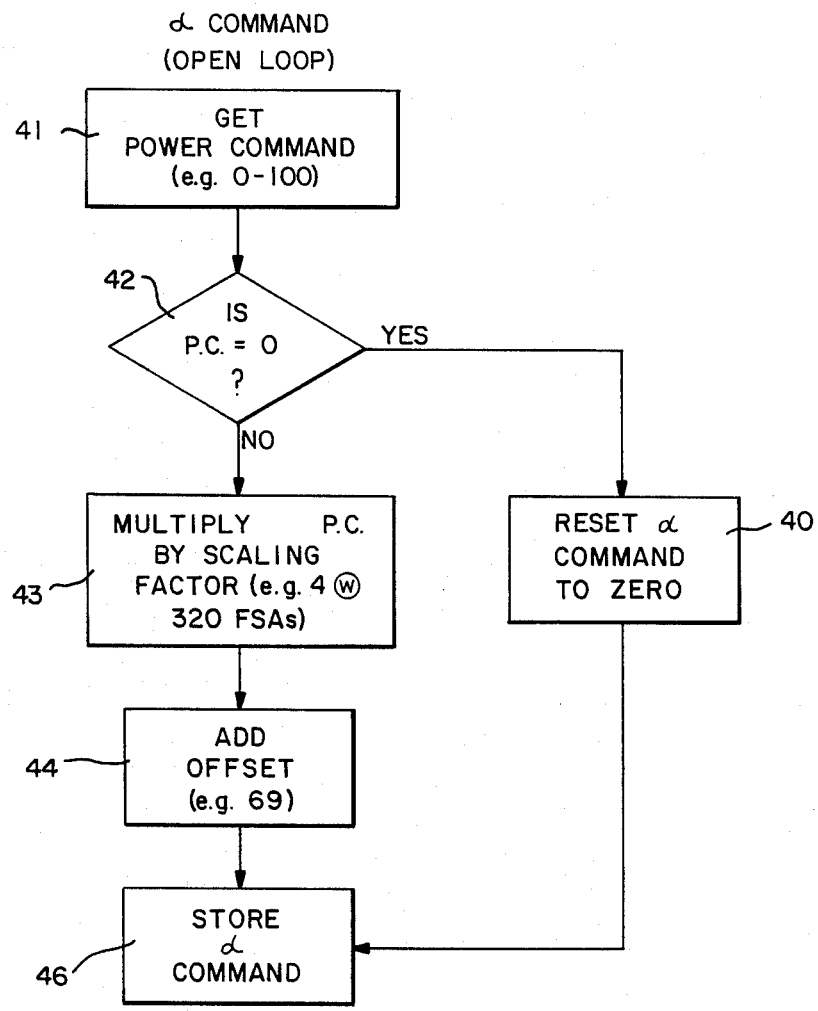
FIG.—4
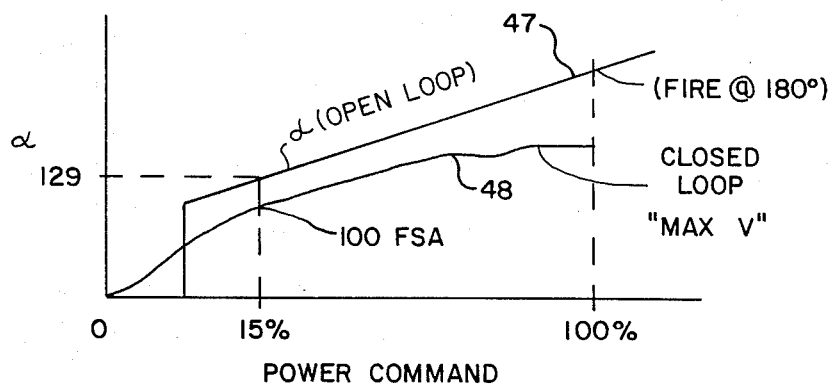
FIG.—5

FIG.—7

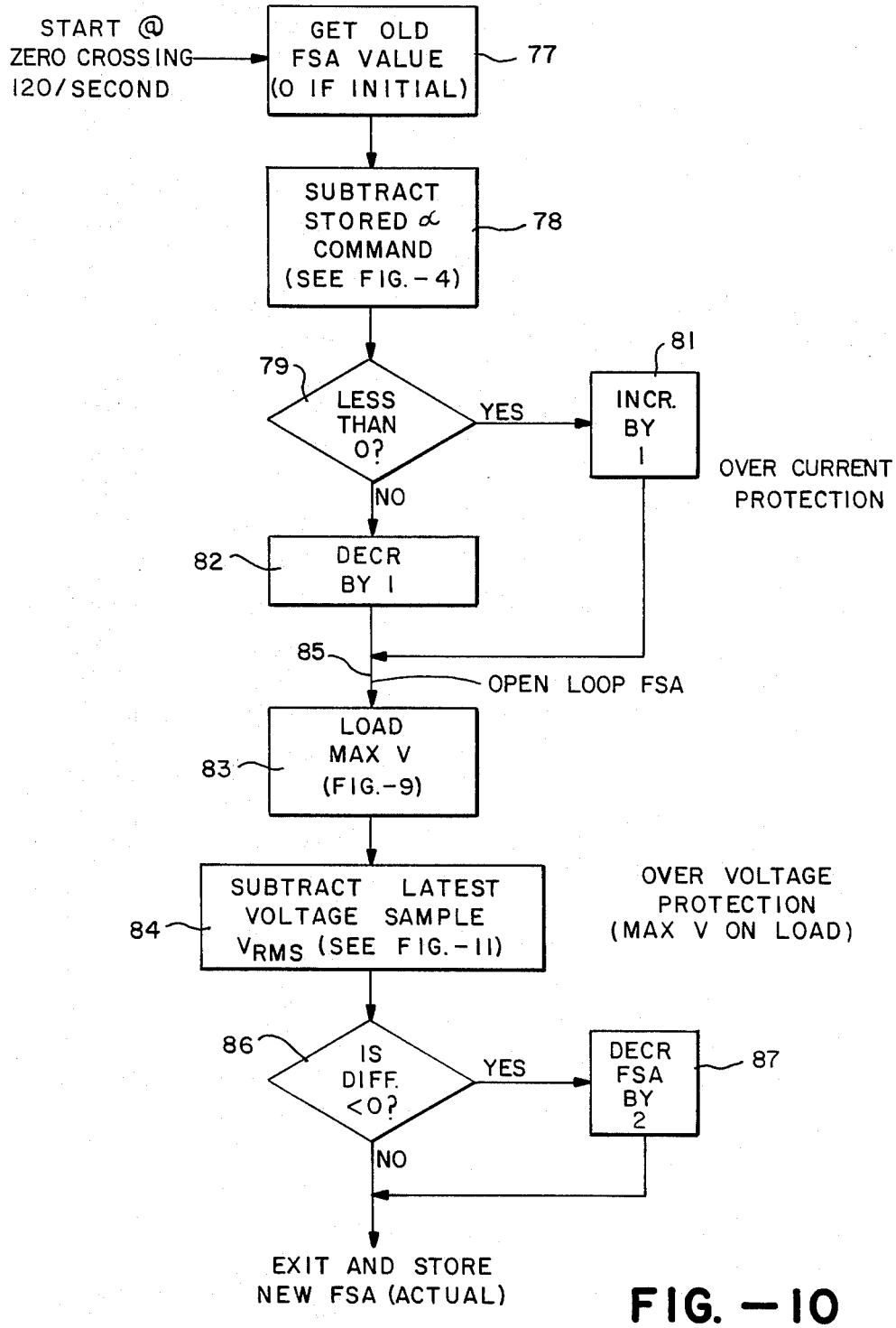
FIG. —10

FIG.-10A

| | | | | | | |
|---|---|---|---|---|---|---|
| | OLD FSA | α COMMAND | MAX V | OPEN LOOP FSA | LOAD V$_{RMS}$ | NEW FSA |
| 110 STEADY STATE SHOWING DITHER | 100 | 129 | 220 | 101 | 225 | 99 |
| | 99 | — | — | 100 | 218 | 100 |
| | 100 | — | — | 101 | 225 | 99 |
| | 99 | 129 | 220 | 100 | | |
| 111 BROWNOUTS 10% VOLTAGE DROP | 99 | 129 | 220 | 100 | 205 | 100 |
| | 100 | — | — | 101 | 208 | 101 |
| | 101 | — | — | 102 | 211 | 102 |
| (14 HALF CYCLES) ~100ms | — | — | — | — | | — |
| | — | — | — | — | | — |
| | 115 | — | — | 116 | 222 | 114 |
| | 114 | 129 | 220 | 115 | 217 | 115 |
| 112 INITIAL "COLD FILAMENT" CONDITION | 0 ←~128 CYCLES→ | 129 | 100 | — | 0 | — |
| | 60 | 129 | 170 | 61 | 150 | 61 |
| | ←~170 CYCLES→ | | | | | |
| | | 129 | 220 | 101 | 225 | |
| | 100 | | | | | 99 |

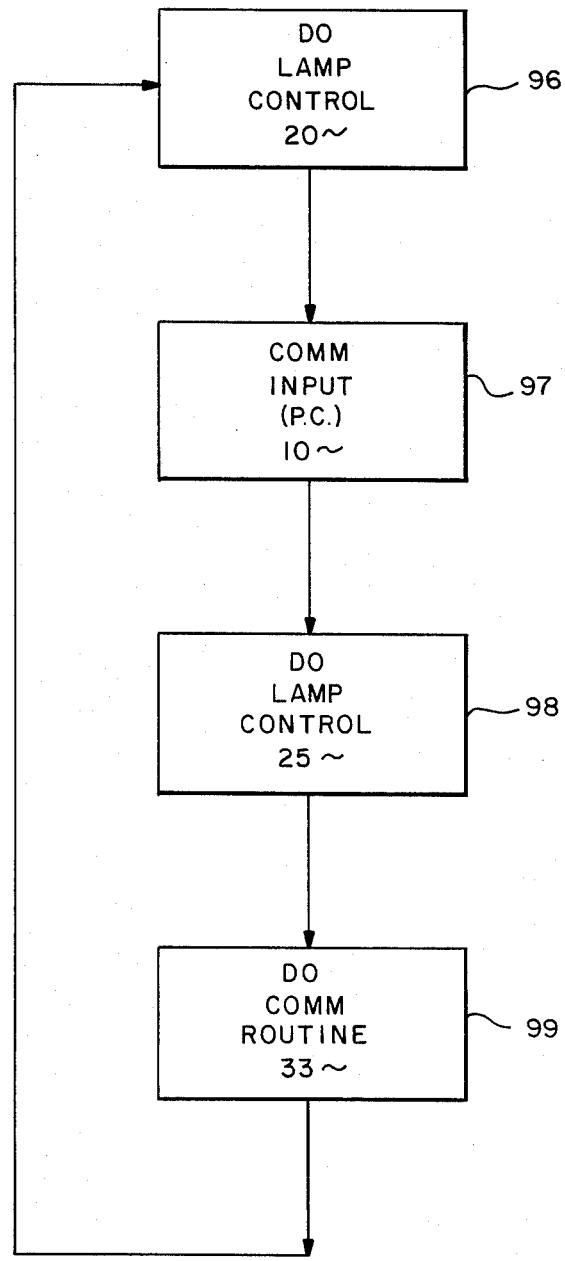
FIG.—13

POWER CONTROLLER FOR HEATER LOAD

BACKGROUND OF THE INVENTION

The present invention is directed to a power controller for a load and more specifically to where the load is a heater for drying moving sheet material.

DESCRIPTION OF PRIOR ART

Radiant heaters having quartz heating elements located in the cross-direction of a moving web of paper, for example, which may be individually controlled to provide an even moisture profile, are disclosed in U.S. Pat. No. 4,494,316 assigned to the present assignee. Such heaters consist of modules with individual quartz heating elements located along the cross-direction of the moving sheet material with a particular group of heating elements being associated with the particular zone or slice of the moving sheet material A cross-direction moisture sensor then feeds back necessary control information to the heaters or dryer units to cause them to control appropriately to provide an even moisture profile.

Thus, in effect, the amount of power applied to each heater element is controlled. This is done by using standard silicon controlled rectifiers (or gate turn-off thyristors) whose firing angle is controlled by an external power command signal to thus regulate the effective amount of AC voltage applied to that particular heater element. Since the amounts of power being controlled are in the hundreds of kilowatts, it is desirable to closely control how power is applied and changed in amount to respond quickly to changes in external conditions, but at the same time, provide for safety and economy in minimizing stress and breakage on the heater elements.

OBJECT AND SUMMARY OF THE INVENTION

Thus, it is a general object of the invention to provide an improved power controller for load.

In accordance with the above object, there is provided a power controller for load where the amount of power applied to the load is controlled by a controlled rectifier (CR) whose firing angle is controlled by an external power command signal. The CR is in series with the load and the series combination is connected across to an AC line voltage. The controller includes transformer means across the line voltage for sensing such voltage and current transformer means for sensing current in the series combination. Digital processing means are provided for sampling the line voltage while the sensed current is above a predetermined threshold to determine the actual load voltage. The digital means also provides a root mean square load voltage value every half cycle of the line voltage. In addition, the digital processing means provide for zero crossing information of the AC line voltage and for digital control of the firing angle to prevent an in-rush of current to cold heater elements. Finally, a dual control system is provided; a feedback loop backed up by an open loop control.

BRIEF DESCRIPTION OF DRAWINGS

FIG. 1 is a block diagram showing the overall system with which the present invention is utilized.

FIG. 2 is a more detailed circuit schematic of a portion of FIG. 1.

FIG. 3 is a more detailed circuit schematic and block diagram of a portion of FIG. 2.

FIG. 3A is a diagram useful in understanding the firing angle control of an SCR.

FIG. 4 is a flow chart illustrating the derivation of an open loop control command from a power command.

FIG. 5 is a graph useful in understanding the concept of the present invention.

FIG. 10 is a flow chart of a routine illustrating obtaining firing slot assignments.

FIG. 10A is a table showing the operation of FIG. 10.

FIG. 13 is a flow chart illustrating the over-all time multiplexing of a digital signal processor associated with the present invention.

DETAILED DESCRIPTION OF PREFERRED EMBODIMENT

Figure 6:
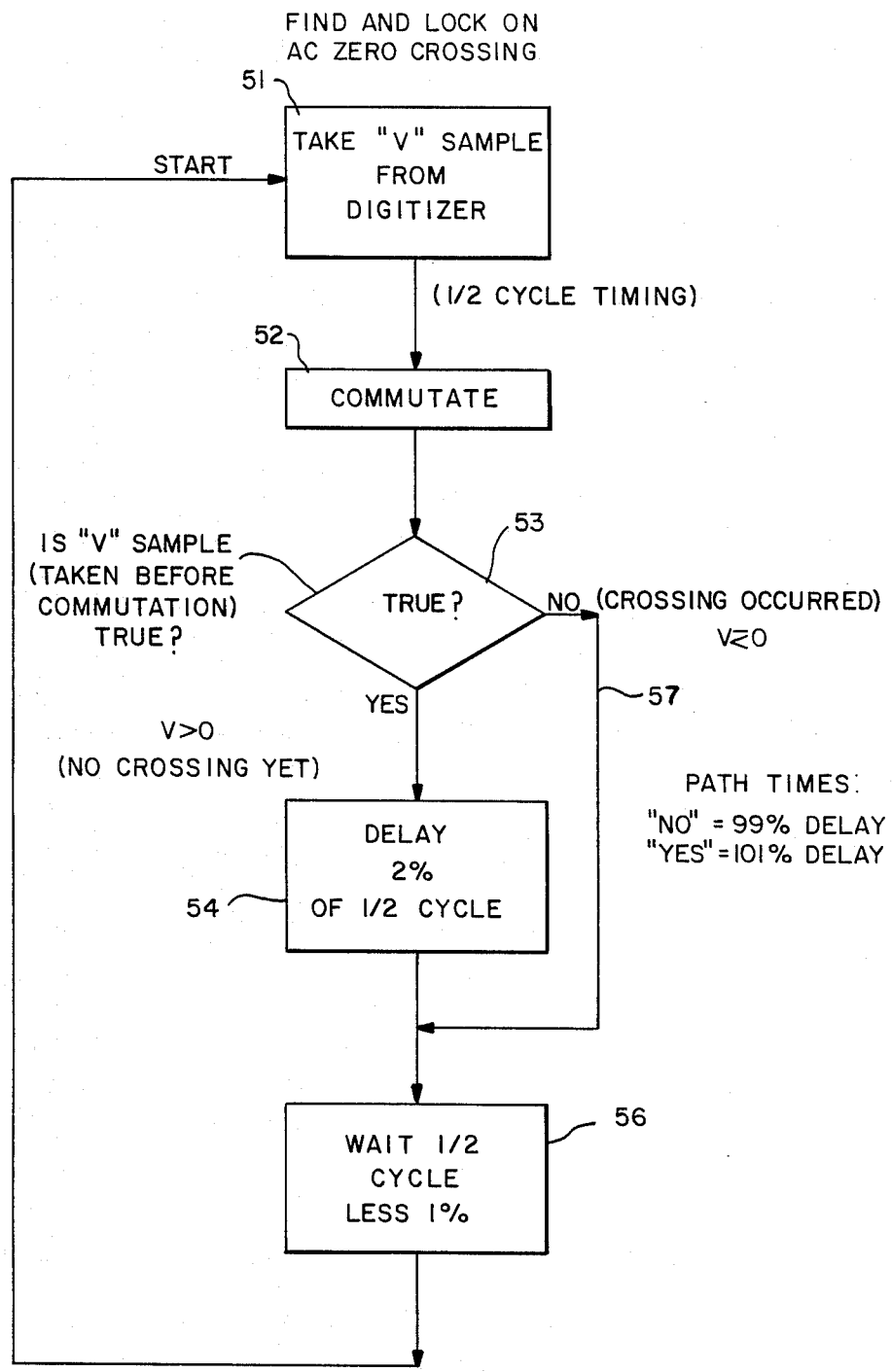
FIG. 6 is a flow chart showing how an AC zero crossing is obtained.

Referring now to FIG. 1, a cross-direction moisture sensing apparatus 10 provides to a moisture controller unit 11 electrical signals representing the moisture profile of, for example, the cross-direction of a moving sheet of paper. Moisture controller unit 11 converts this profile into a power set point profile which in effect is the amount of drying power necessary for each particular zone or slice of the sheet material. In other words, the cross-direction moisture sensor apparatus has a desired set point for each zone (for example, to provide a flat moisture profile) and if this set point is deviated from, then the appropriate drying power is determined by the moisture controller unit 11. Such information is converted by a master computer 12 which has a serial digital output $R_x$ which may, for example, be at a rate of 19.2K bits per second. This line contains digital information in sequence of the power command for each zone. And this is done for successive cross directions.

Connected to the computer 12 are several zone unit controllers (ZUCs) 13, each ZUC pertaining to a single zone to be controlled. The ZUC 13 has a serial digital feedback line $T_x$ which is an answer back to computer 12 to complete a handshake with the data flowing to it on line $R_x$. Then each ZUC 13 is coupled through individual lines to various portions of a moisture actuator 14 which contains heating elements arranged along the moving sheet of paper in a cross-direction.

Moisture controller unit 11 provides an on sheet (O/S) indication on line 15 to each ZUC 13 to show the moisture sensing apparatus is actually in a control mode (and that it is permissible to apply power to the load).

As more fully illustrated in FIG. 2, moisture actuator 14 for each zone contains a silicon controlled rectifier (SCR) 16 (or alternatively a gate turn-off thyristor; GTO) which is in series with a load or heater element 17 and placed across the line voltage terminals 18. The standard parallel connection of the SCRs (which provides operation on both positive and negative half cycles), along with isolation and pulse amplifiers, is not shown. Although only a single heater element is illustrated, normally they would be connected in a three phase delta configuration. The line voltage terminals 18, in addition to driving the load 17, drive a synchronizing transformer 19, which provides the line voltage signal to ZUC 13. A current transformer 21 on one of the load lines to the load 17 provides the load current, I, to ZUC 13. As will be discussed later, these values are processed to provide the information as to power going to the load as well as the load and line voltage and load current.

As is apparent from examination of FIG. 2, there is no direct voltage measurement taken across load 17 by an associated transformer coupled to it. This avoids problems with transformer reliability due to the inherent high frequency vibration components introduced by the firing angle control of SCR 16. And this firing angle control is provided by the fire line input 22 from ZUC 13. Very briefly, the effective amount of voltage across load 17 is regulated by the timing of the firing angle of SCR 16 in a manner well known in the art. Of course, a GTO operates so that its "firing angle" opens the circuit connection compared to the closing of the SCR.

A more detailed circuit schematic of a single zone unit controller 13 is illustrated in FIG. 3. As discussed above, there is one ZUC per SCR and thus, as shown in FIG. 3, the fire output on line 22 would be connected to corresponding SCR 16. This is accomplished by the load line interface unit 23 which also has a general communication output to provide for effective linking to the controlled unit. The processing heart of ZUC 13 is a digital signal processor 26. This standard off-the-shelf device may be, for example, a processor manufactured by Texas Instruments Corporation of Dallas, Tex., Model No. TMS32010. Input data as to line voltage, V, and load current, I, is coupled to the processor 26 via a digitizer 27 over data and control lines as indicated. One input to digitizer 27 labeled 'I' is via a voltage to voltage single ended converter 28 which receives its input from the current transformer 21 (FIG. 2). The other input to the digitizer 27 designated, V, is the line voltage from transformer 19 via a voltage to voltage balanced converter 20.

With regard to both inputs, the voltage and current are rectified by means of an inverter 29 and 29' and a commutator or switch 31 and 31' which are actuated by a signal, as indicated by the dashed line 52, from digital signal processor 26. Thus a full wave signal, such as indicated at 32, is provided the digitizer for processing purposes. In addition to full wave rectification this commutation circuit—since it switches at every plus to minus zero crossing of the AC line voltage—effectively provides by means of the commutating signal from processor 26 a zero crossing signal.

Because of the high rate of data flow required to update the control requirements of the apparatus, the digitizer 27 is a type known as a "video analog to digital converter." One suitable type device is available from Analog Devices Corporation, Model No. 7824. It has the common name "Flash Converter."

A power command input signal to processor 26 is through the line $R_x$ (already discussed) via a communications input interface unit 33. This is a standard interface for a type RS485. In addition, there is the on sheet input 15 to show, that the associated cross-direction moisture sensing apparatus 10 (see FIG. 1) is in a control mode. An answer back on the $T_x$ line is provided by the communications output unit 34 from processor 26.

From an operating cycle standpoint, communications and firing control rates are at 38.4 KHz. And the strobe signal for digitally reconstructing and sensing the voltage and current input at digitizer 27 also occurs at this frequency. Thus, since for control purposes the number of timing intervals (firing slots) of a half-cycle of an AC waveform must be broken down into a large number to provide for a sufficient fineness of control, this is related to the 38.4 KHz by selecting an appropriate number of firing slots, such as 320 for 60 cycles and 344 for 50 cycles.

In summary, the firing command on line 22 is actually given during one of the assigned firing slots. It is also related to an alpha function, as will be described in detail below. Moreover, as shown in FIG. 3A, only the firing slots of zero through 320 which occur after the beginning of the sine wave and before the end of the one-half cycle are used for firing and strobing since the cross-hatched ends are used for lamp control and housekeeping.

FIG. 4 illustrates one of the techniques of deriving an open loop alpha command from the power command which is derived as illustrated in FIG. 3 originally from the moisture controller unit 11 (FIG. 1). As will be discussed below, there is also a closed loop command system which operates in conjunction with the open loop system.

Referring specifically to the flow chart of FIG. 4, the first step performed by digital signal processor 26 is step 41, which is the getting of the power command. This is determined by the moisture controller 11 (FIG. 1) and is typically in units of zero to 100. Next, in step 42 the question is asked whether or not the power controller command is set at zero and if so, then there is an immediate reset of the alpha command to zero (step 40), meaning that the SCR, if presently firing, ramps down three firing slots at a time until it is no longer firing. This is explained below with FIG. 10. If it is not zero, then in step 43 this power command is scaled to relate to the zero-320 firing slot assignments if this is the case. Thus, assuming a zero to 100 power command, it is multiplied by 4 in this specific case. Next, in step 44 an offset is added, for example, 69, so that the alpha command is always greater than a closed loop "MAX V." Then, in step 46 this alpha command is stored for later use.

FIG. 5 illustrates the relationship of the alpha command on the vertical axis (which is related to firing angle) to the power command (which in this specific case ranges from zero to 100). It is a roughly linear relationship where the greater the power required, the larger the alpha command. This curve 47 is labeled "open loop." However, there is another control loop (closed loop 48) which relies on the feedback of the actual power being supplied to the load. Necessarily, this averages several cycles of voltage, for example, 128 to determine the long range trend of the desired power command. The foregoing dual control scheme which will be discussed in detail below, in addition to preventing excessive amounts of firing for a given set point in abnormal conditions, provides for fast response times, inrush current protection, for example, for cold heater elements, and in addition, brownout or surge voltage compensation.

But before discussing the above control techniques, a zero crossing of the AC line voltage waveform must be found in order to provide a reference for the control of the firing angle. This is illustrated by the flow chart of FIG. 6 which is again accomplished by the digital signal processor 26. In step 51 the voltage sample is taken from digitizer 27. A commutation control pulse causes the switches 31 and 31' (see FIG. 3) to switch perform a commutation. The commutation step 52 (which generates this pulse) is indicated. A truth table in step 53 asks if the voltage sample, taken before the commutation, was true; i.e., not equal to zero (digitizer 51 cannot sense negative values, and thus when these are present, indicates zero). If the crossing occurred where the voltage is equal or less than zero, a NO answer is given; if the voltage is greater than zero, then YES with the assumption that no crossing has occurred yet. A YES answer is routed through a delay path which in effect provides a delay slightly greater than one-half cycle of the line voltage. A NO answer skips this delay and causes the next start or strobe to be taken at a time slightly less than a half-cycle period.

Very specifically, the YES answer is fed through, as indicated in step 54, a delay of 2% of the half cycle and then through a second delay indicated in step 56 of one-half cycle less 1%. In addition, through the routing 57 the no answer is fed through the same step 56 and then a return to start is made. As indicated in FIG. 6, the path time for the 'NO' is a 99% delay and for the 'YES' is 101% delay. Thus, these delays 54 and 56 will cause the commutation signal at 52 to be driven to and substantially occur at the plus to minus zero crossing. At the same time this commutation signal provides for a full wave rectification of both the line voltage and current, as indicated in FIG. 3 to thus allow the digitizer 27 to effectively strobe the positive half cycles (since it is not capable of sensing negative half cycles). This facilitates the digital software power control. This loop will lock onto a frequency range of ±1% from nominal to the zero crossing.

Figure 7:
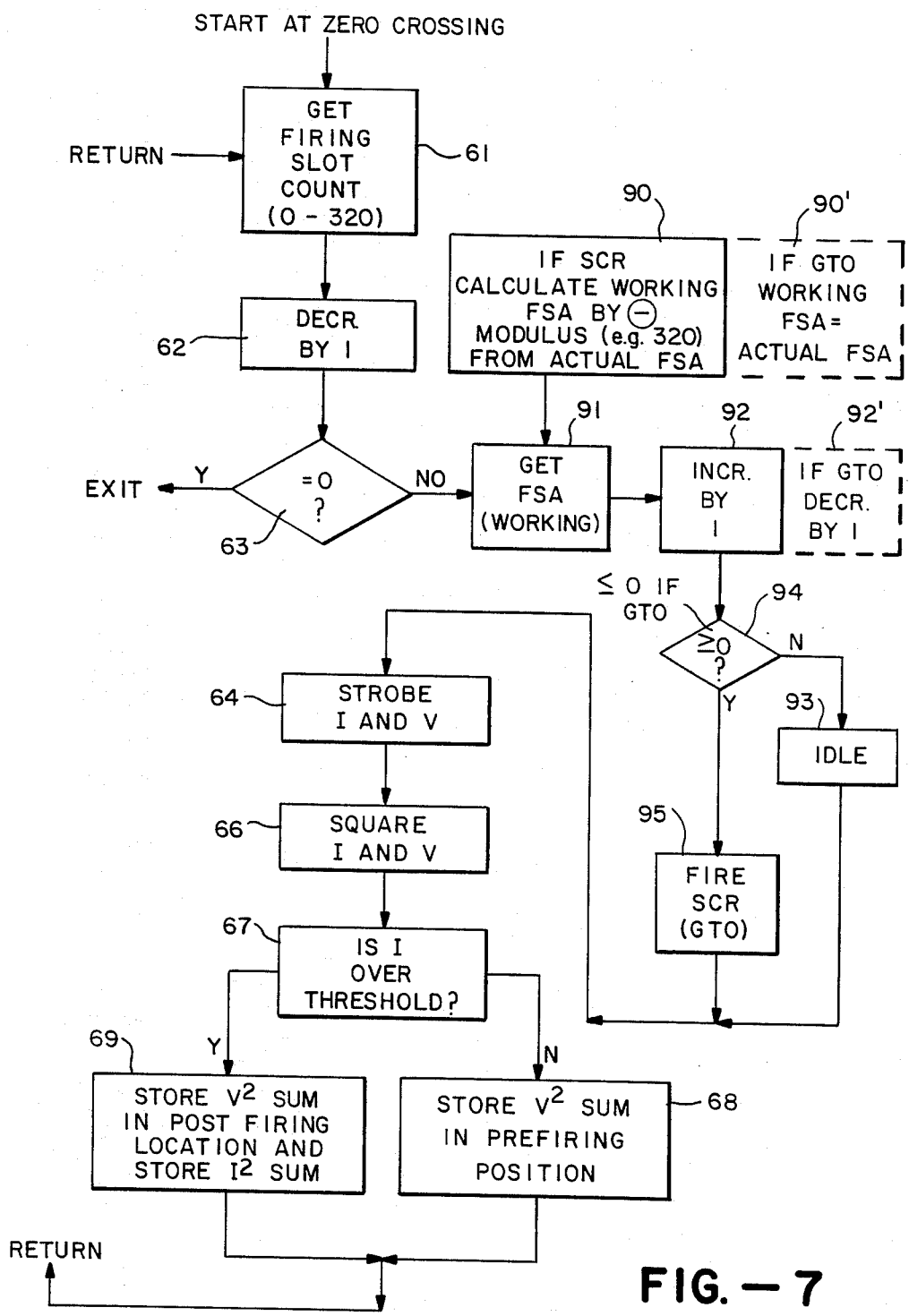
FIG. 7 is a flow chart illustrating how a firing command is obtained.

As briefly discussed above, to provide a closed loop control scheme, the amount of power being supplied to the load must be continuously measured. This is accomplished as illustrated in FIG. 7 by a lamp (heater) firing slot routine. In step 61 there is a firing slot count which may range from zero to 320 (384@50 Hz). Such count would normally start at 320 (less a housekeeping offset) and is initiated by a start from the zero crossing commutation signal discussed above. In step 62 it is decremented by 1. If equal to zero, then the program exits the routine. If not equal to zero as indicated in step 63, the program goes on to determine if it is time to fire the lamps.

A working FSA (firing slot assignment) is initially calculated (step 90) by subtracting the modulus of 320 (the total number of firing slots) from the actual FSA (stored in FIG. 10). The reason for this is because, in a manner well known in the art, the maximum amount of power, for an SCR, is actually a zero firing slot. Note that for a GTO the working FSA equals the actual FSA at first (step 90'). The working FSA is gotten (step 91) and incremented by one (step 2) (or decremented if a GTO). If it is not equal to or greater than zero (see step 94; if a GTO the decision is not equal to or less than zero for a GTO), a 'NO' return is made to strobe I&V (step 64) via idle 93 in accordance with the 38.4 KHz cycle time. The LFS routine continues cycling via "RETURN" until the firing slot count has been decremented to zero (step 63). The "working" FSA is incremented (on SCR models) or decremented (on GTO models) until the routine exits as discussed above. When the FSA count passes zero (step 94), the program causes the lamp to be fired (step 95), if enabled by an ON-SHEET command. Such "passing through zero" is from a negative direction in the case of an SCR or positive direction for a GTO.

To complete the routine, both voltage and current (V and I) are strobed via the control lines going to digitizer 27. (Step 64) Because the digitizer is of the high speed flash converter type, this may be done at the 38.4 KHz rate. Next, in step 66 for effective measurement of power, the I&V are squared. Then in step 67, which is the crucial step to eliminating the requirement for a transformer across the load, the question is asked is I over threshold? If it is not over the threshold, then the NO branch is taken and in step 68 this squared voltage is stored in a "pre-firing location"; thus, this indicates that the SCR has not yet fired and thus no load current is present. On the other hand, if there is a 'YES' answer to the over-threshold question, then in step 69 the $V^2$ sum is stored in a post firing location and also an $I^2$ sum is stored (current below threshold is largely noise, and is therefore ignored). Thus, the complete voltage current information for the load is stored in steps 68 and 69, which provides by multiplication of RMS voltage and current, the power being supplied to the load and in addition, indicates the current voltage being applied to the load in order to compensate for voltage surges or sags.

Figure 9:
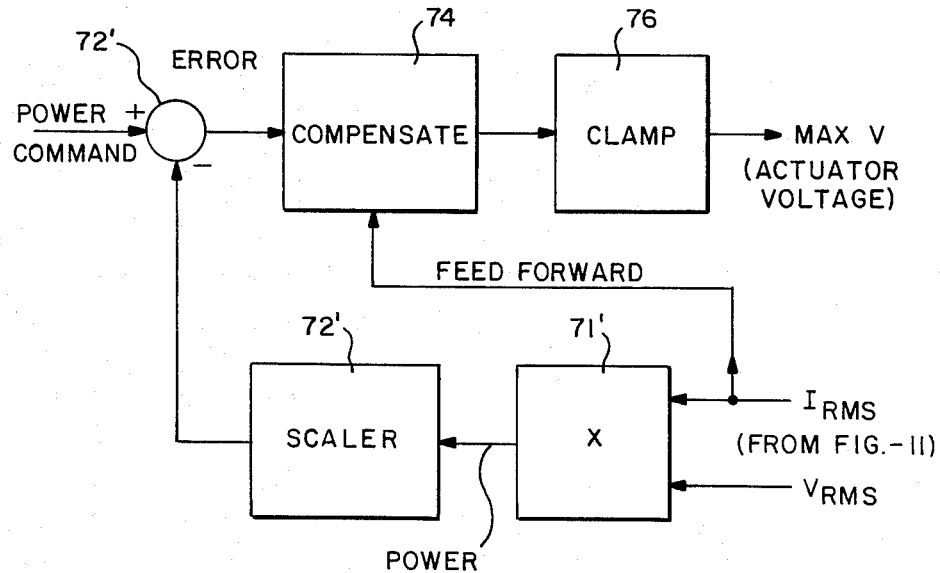
FIG. 9 is an equivalent circuit block diagram of the software routine of FIG. 8.
Figure 11:
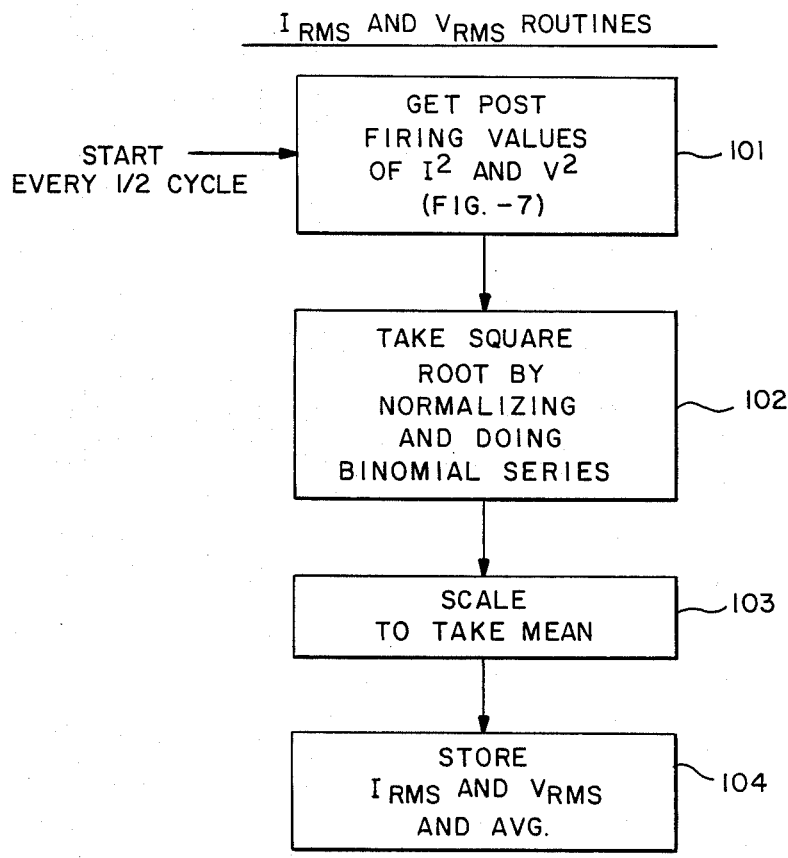
FIG. 11 is a flow chart showing how RMS values are obtained.

FIG. 11 shows the routine for processing the above voltage to provide a new IRMS and VRMS every half cycle in order to provide fast control response and in addition averaged values to provide effective closed loop feedback control (see FIG. 9).

In step 101 the $I^2$ and $V^2$ post firing values are gotten from the firing slot routine of FIG. 1 (see steps 68 and 69) every one-half cycle. Then in steps 102 and 103 the root and mean are taken, stored in step 104 and averaged over 128 cycles.

Figure 8:
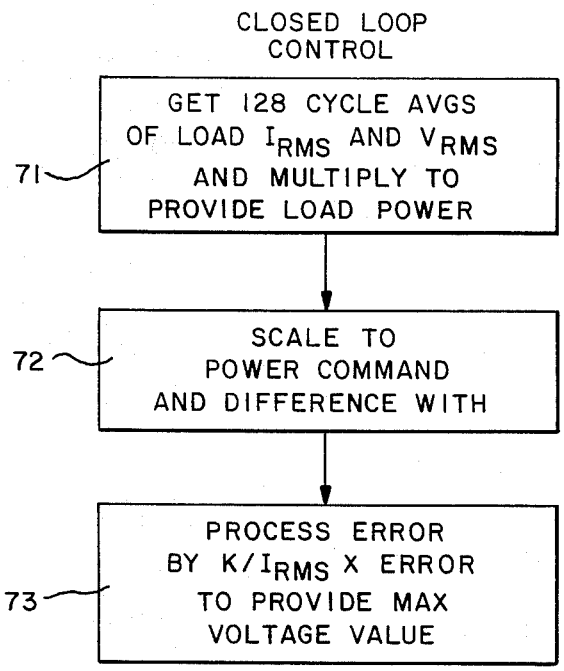
FIG. 8 is a flow chart illustrating a closed loop routine the present invention.

FIGS. 8 and 9 indicate the closed loop control which is graphically shown in FIG. 5 as curve 48. FIG. 9 is an equivalent circuit representation of the software of FIG. 8 which is actually accomplished by the digital signal processor 26 (FIG. 3). To ascertain the amount of power being applied to the load, the averaged root mean square values of voltage and current must be gotten (see FIG. 11, step 104), as indicated in FIG. 8 in step 71 and multiplied together. This is also shown by the block 71' in FIG. 9. This power signal is then scaled as indicated in step 72 and subtracted from the power command, as also shown by differencer 72' in FIG. 9. As indicated in step 73 this is processed to provide an actuator or maximum voltage value updated once every 128 cycles. The resultant error signal is processed to compensate for current gain changes by feed forwarding IRMS; this is done in software by division, K/IRMS, as shown in step 73. Then a clamp 76 (also in software) limits changes.

While the closed loop feedback of FIGS. 8 and 9 is suitable for long term control and was utilized in analog form in prior control circuits, it had serious control limitations when a fast response was desired to abnormal conditions, including broken lamps or shorted wires. Also, there was inaccurate response for warmup or voltage surge conditions and it did not adjust quickly nor sense alarm conditions. By the use of the digital control scheme, including, as will be discussed in FIG. 10, the firing slot assignment and the determination of alpha, this provides a dynamic control which is by nature robust so that it senses changes in one-half cycle and responds to changes of line voltage and other abnormalities in 5-10 cycles. This is opposed to prior analog feedback circuits where as many as 15 to 20 cycles are required to sense a change in conditions and 150 to 200 cycles are required to make a necessary control change.

Referring now to the open loop control scheme illustrated by the flow chart of FIG. 10 in the initial step indicated at 77 the old firing slot assignment (FSA) value is gotten. Referring to FIG. 3A, this would be one of the slots from zero to 320. Of course, if no control has been implemented yet, this is set at zero. The start for step 77 occurs at the zero crossing which is once every half cycle of the line voltage. And of course, this zero crossing reference is gotten as discussed above in conjunction with FIG. 6. Next in step 78, the stored alpha command is subtracted from the FSA value. As discussed in conjunction with FIG. 4, this alpha command was derived from the original power command. Next in step 79, the question is asked, is the difference less than zero? If 'YES' the FSA is incremented by one and if 'NO' it is decremented by one. This is shown by steps 81 and 82. In general, only incrementing will take place here unless there are gross changes in the commanded power level.

Continuing with the control routine of FIG. 10, the open loop FSA value at 85 is next checked to see whether it has supplied a voltage which is less than the maximum or actuator voltage that it is desired to have on the load. In step 83 the maximum voltage is loaded from the closed loop control of FIGS. 8 and 9 and as illustrated in FIG. 5. Under normal conditions the closed loop or "servo" drives the FSA to a value less than it would be with open loop control; viz, see the offset of step 44 in FIG. 4. When the subtraction occurs in step 84 of the latest voltage sample, there will normally have been an increment of one (step 81). If the difference is negative, as provided by steps 86 and 87, the FSA is decremented by two for a net decrement of one. If the difference is positive, then nothing happens, and there is a net increment of one.

In the normal mode of operation, assuming that a constant firing slot assignment is being utilized to apply a constant amount of power (and heat) to a moving sheet material, for example, it is apparent that the firing angle will be changed by an increment or decrement of one each time dithering back and forth between the theoretically desired value. This provides the robustness of the control where if a control or load change occurs, the entire system will quickly respond. And the system responds to changes in line voltage immediately, since the voltage is updated every half cycle. The table of FIG. 10A at 110 shows the foregoing dithering where a 15% power command is assumed as shown in FIG. 5. If, for example, this is an initial condition and the heating elements are, for example, cold, then a full power condition can only be implemented by an increase of a single slot (at the most) per each one-half cycle of line voltage. See FIG. 10A at 112. Here the closed loop provides some control delay also. (This of course could be any integral number of slots depending on the application.) In any case, a large surge current is prevented by the gradual increase in alpha and the firing angle as the integral increase of firing angle is cycled at a maximum rate of the repetitive frequency of the zero crossings of the line voltage frequency.

If there is a voltage sag or brownout, FIG. 10A at 111 illustrates how a 10% voltage drop is remedied in approximately 14 half cycles. In comparison, a standard closed loop servo by itself would require 360 to 480 half-cycles to compensate for the same parameter variation.

When a zero power command is given, the maximum voltage value will be zero and the alpha command will also be zero, then a decrement by one will occur in step 82 and a decrement by two in step 87 and thus, three decrements will rapidly ramp down the circuit voltage.

Figure 12:
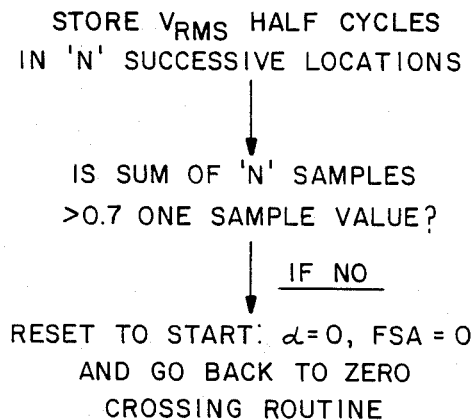
FIG. 12 is a flow chart of a line monitor routine.

FIG. 13 shows the basic work cycle of the digital signal processor of FIG. 3 in order to effectively interrogate the digitizer 27 so that the flow of information is gotten quickly enough to implement control moves within time constraints. The digital signal processor of the type utilized has 88 machine cycles which occur in one firing slot, the firing slot being a nominal 38.4 KHz. Thus, the machine cycles are divided as follows as shown in FIG. 12. In step 96 the lamp control for the heater elements is processed for 20 cycles; in step 97 communications inputs are processed for example, the power command, for 10 cycles; in step 98, lamp control is again accomplished for 25 cycles; and then the remainder in step 99 is communications. This type of program structure provides real-time processing of both the heater control and the communications with the master computer. Real-time processing is by its nature the fastest and most effective way to do the work that is required to provide heater control.

In conclusion, the present invention provides a power controller, for typically the heater elements of an actuator in a papermaking machine, with fast response, but which protects against inrush current and brownout or surge voltage, all within a halfcycle of operation. In addition, from a mechanical standpoint, no potential transformer is utilized across the load (only a line voltage transformer) and true RMS values are quickly calculated to provide for a true measure of power. And in general, the entire control circuit is digitized to a full extent, for example, including the zero crossing detection technique, to effectively combine the advantages of analog closed loop feedback control in a digital type of system. And such a dual system is especially tailored to control leads such as heater elements which are sensitive to current surges and overvoltage and voltage sags. Real time software absorbs many functions previously in hardware.

I claim:

1. A power controller for a load where the amount of power applied to the load is controlled by a controlled rectifier (CR) whose firing angle is controlled by an external power command signal, said CP being in series with said load and the series combination being connected across an AC line having a nominal voltage, the improvement comprising:

means for sensing the zero crossings of said line voltage to provide a timing reference for control of said firing angle of said CR, including switching means for commutating said line voltage with an inverter to synchronously demodulate said line voltage to provide a full wave rectified line voltage;

means for digitizing said rectified line voltage;

said switching means including digital processing truth means for sensing whether or not said digitized voltage is greater or less than zero at the time of said commutation, and including delay means for routing the answer to said truth means through delay paths, either slightly less or greater than one-half cycle of said line voltage in accordance with the answer to whether or not the digitized voltage is greater than zero to drive said commutating to occur substantially at a zero crossing, whereby said switching means provides for said full wave rectification and at the same time a zero crossing indication of said AC line voltage at the time of commutation.

2. A controller as in claim 1 where said zero crossing is from the positive to negative halves of the AC line voltage.

3. A controller as in claim 1, said delay paths varying less or greater by the same amount.

4. A power controller for a load where the amount of power applied to the load is controlled by a controlled rectifier (CR) whose firing angle is controlled by an external power command signal, said CR being in series with said load and the series combination being connected across an AC line having a nominal voltage, the improvement comprising:

means for digitally controlling said firing angle over a predetermined number of firing slots of said R per one-half cycle of said line voltage, including with a control change, limiting an increase of said firing angle to increase power to an increment which is an integral number of slots whereby if said load is a heater, the in-rush of current to a cold heater is prevented, said means also, for every said one-half cycle, changing said firing angle by an integral increment or decrement, irrespective of any control change.

5. A controller as in claim 4 in which said increment of integral firing slots is time related to the frequency of said power line.

6. A controller as in claim 5 where for a 60 cycle line voltage frequency, there are 320 firing slots per half cycle and thus, the time increment for a single firing slot occurs at a rate of 38.4 KHz.

7. A controller as in claim 4 where said integral increase in firing angle is cycled at a maximum rate of the repetitive frequency of the zero crossings of said line voltage frequency.

8. A controller as in claim 4 including overvoltage protection means for sensing the latest one-half cycle of said line voltage and if in excess of a maximum voltage decrementing by double said previous increment and if not in excess allowing said previous increment to remain.

9. A power controller as in claim 4, together with feedback control loop means responsive to power applied to said load, and including means for comparing said applied power to said power command to control said applied power for steady state conditions, said means for digitally controlling including means for controlling applied power during transient conditions.

* * * * *